(12) United States Patent
Chen

(10) Patent No.: US 10,755,153 B2
(45) Date of Patent: Aug. 25, 2020

(54) METHOD OF GENERATING 3-DIMENSIONAL CODE BASED ON GAUSSIAN MODULATING FUNCTION

(71) Applicant: VR Code (Xiamen) Network Technology Co., Ltd., Xiamen, Fujian Province (CN)

(72) Inventor: Shengxu Chen, Xiamen (CN)

(73) Assignee: VR CODE (XIAMEN) NETWORK TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 15/808,001

(22) Filed: Nov. 9, 2017

(65) Prior Publication Data

US 2018/0260671 A1 Sep. 13, 2018

(30) Foreign Application Priority Data

Mar. 13, 2017 (CN) .......................... 2017 1 0146047

(51) Int. Cl.
*G06K 19/06* (2006.01)
(52) U.S. Cl.
CPC .............................. *G06K 19/06037* (2013.01)
(58) Field of Classification Search
CPC ........ G06K 19/06037; G06K 19/06178; G06F 17/30876

USPC ................................................. 235/494, 487
See application file for complete search history.

(56) References Cited

U.S. PATENT DOCUMENTS

| | | | |
|---|---|---|---|
| 6,572,025 B1 * | 6/2003 | Nishikado .............. | G06K 1/123 235/462.09 |
| 2012/0256007 A1 * | 10/2012 | Cok .................. | G06K 19/06178 235/494 |
| 2013/0068831 A1 * | 3/2013 | Cok .................. | G06F 17/30876 235/375 |
| 2015/0317923 A1 * | 11/2015 | Edmonds ............... | G02B 5/208 40/541 |

* cited by examiner

*Primary Examiner* — Karl D Frech
(74) *Attorney, Agent, or Firm* — John Alumit

(57) ABSTRACT

A method of generating 3-dimensional code based on Gaussian modulating function is disclosed. First, generating a two-dimensional code that includes embedded information, utilizing a image which need to be processed to obtain a threshold mask, then determining attribute of modules block, adjusting luminance of modules block, blending processed image and a corresponding area of the two-dimensional code for mark points to generates 3-dimensional code. This method improves the reading the identification of 3-dimensional code and improves the correct rate of decoding, implements visually optimized.

8 Claims, 13 Drawing Sheets

(a)

(b)

(c)

(d)

(a) (b)

METHOD OF GENERATING 3-DIMENSIONAL CODE BASED ON GAUSSIAN MODULATING FUNCTION

FIELD OF THE INVENTION

This invention relates to a method of generating 3-dimensional code.

BACKGROUND OF THE INVENTION 2-dimensional codes are symbols formed by black-and-white pattern in the coronal and transverse planes. Comparing to 1-dimensiona codes as shown in FIG. 1(a), two-dimensional bar codes possess the advantages of greater amount of information, higher density information, high reading speed, wider range of encoding, lower product cost, and strong fault-tolerance. Because of such advantages, the technology of two-dimensional codes are a topic competitively developed by all countries in the world, and widely used. Respectively, Denso Wave (reference [1]) of Japan have developed QR Code (Quick Response Code), as shown in FIG. 1(b), symbol of US have developed PDF 417 code, as shown in FIG. 1(c), and Chinese-sensible Code was developed by Chinese, as shown in FIG. 1(d).

QR Code is a 2-dimensional code formed by a back-and-white checkered pattern. QR is the short form of Quick Response, because the inventor pursued QR Code to allow its contents to be decoded quickly. QR Code is originally applied in automobile management system, then utilized for warehouse management throughout various industries. Now, following the developments of network medium and smartphones have become popular, people are relying more and more on the Internet to obtain required information. Since QR Code having excellent tracking ability of information, two-dimensional codes have been widely adopted in the marketing and advertising industries, they are commonly used for transmission of medium for advertising, two-dimensional codes can easily be accessed by scanning with a mobile phone camera.

The 2-dimensional codes referred to in this case are QR Code, and all technical parameters related to the two-dimensional code use its standard production method.

Due to the limitations of the 2-dimensional codes encoding mode, 2-dimensional codes can not present various performance randomly after the beautification processing, thus, Artists and researchers are researching a method for beautify the 2-dimensional codes. (reference [2-10]) for the purpose of visual effect and stability of encoding. Based on whether change encoding mode of 2-dimensional codes module, there are basically divided into two categories:

A first method of beautify the 2-dimensional codes is changing the encoding-algorithm of 2-dimensional code module information. The method proposed by paper (reference [11-12]), because 2-dimensional codes have fault-tolerance, even if part of the module is replaced with an image or logo, the 2-dimensional codes still can be decoded correctly. However, if the images are superimposed on the location mark or the correction mark, correct rate of decoding can be severely degrade, so, the most common method is to embed the images or symbols into the central region of the image (reference [13]), as shown in FIG. 2(a). This method limits the location of the modified module area, and the image area is only a small part of the 2-dimensional code, beautifying effect is not good enough. In addition, the code word generation process didn't be used well, deteriorating the readability of the 2-dimensional code.

The second method is for not changing the encoding-algorithm of 2-dimensional code module information, directly modifying luminance or color of the corresponding theme image. Some artists adjustment the color of 2-dimensional code to achieve artistic effects, such as shown in FIGS. 2(b) and 2(c). FIG. 2(d) is produced by Visualead (reference [14]) Online program, the method is changing the luminance of the pixels in the center of the module. Because the decoder the sampling area of the decoding region is the central region of the module, so this method can balance the decoding robustness and image fidelity. However, the proportion of the modified central pixels in the 2-dimensional code module is large, and connected Quality of images decreases. This method is not changing the encoding-algorithm of 2-dimensional code module information, guaranteeing robustness of coding, but the sampling spots of the decoding dispersed in the image, that defects have a bad influence on visual appearance.

In conclusion, A main challenge in any method of beautify the 2-dimensional codes is that the 2-dimensional codes can be decoded by standard application. The introduction of pixels results in a change in the luminance of the 2-dimensional code, the binarization threshold was twisted, and increased the probability of decoding errors. Visual optimization of the whole region of 2-dimensional code are also challenging, the error-correcting capability of 2-dimensional code has a limited, so one cannot simply replacing the image pixel with 2-dimensional codes module.

The list of references as follows:

[1] Denso Wave: http://www.qrcode.com/en/index.html
[2] LogoQstore: https://www.logoqstore.com/
[3] A.T Communications: http://logoq.net/logoq/index.html
[4] Get QR Code Generator Pro: http://www.qr-code-generator.com
[5] QRhacker.com: http://www.qrhacker.com
[6] Huaban: https://http://huaban.com/pins/756443579
[7] Frame QR: http://www.vitreoqr.com/2014/Frame_QR.html
[8] QR Pixel: http://www.qrpixel.com
[9] QR Code Artist: http://www.qrcartist.com
[10] QuickMark Color: http://color.quickmark.com.tw
[11] S. Ono, K. Morinaga, and S. Nakayama, "Two-dimensional barcode decoration based on real-coded genetic algorithm," IEEE Congress on Evolutionary Computation, pp. 1068-1073, 2008.
[12] D. Samretwit and T. Wakahara, "Measurement of reading characteristics of multiplexed image in QR code," International Conference on Intelligent Networking and Collaborative Systems, pp. 552-557, 2011.
[13] Unitag: https://www.unitag.io/qrcode
[14] Visualead: http://www.visualead.com
[15] Normal distribution: https://en.wikipedia.org/wiki/Normal_distribution
[16] ZXing.Net: https://zxingnet.codeplex.com
[17] G. J. Garateguy, G. R. Arce, D. L. Lau and O. P. Villarreal, "QR images: optimized image embedding in QR codes," IEEE Transactions on Image Processing, vol. 23, no. 7, pp. 2842-2853, 2014.
[18] H. K. Chu, C. S. Chang, R. R. Lee, and N. J. Mitra, "Halftone QR codes," ACM Transactions on Graphics, vol. 32, no. 6, pp. 217:1-217:8, 2013.
[19] W. C. Liao, "Visual arts-oriented QR code," M.S. thesis, Yuan-Ze University, 2015.

SUMMARY OF THE INVENTION

The present invention provides a method of generating 3-dimensional code based on Gaussian modulating function, this method improves the identification reading 3-dimensional code and improves the correct rate of decoding, implements visually optimized.

To achieve the objective above, the technology solution is:

A method of generating 3-dimensional code based on Gaussian modulating function comprising the steps of:

Step 1, generating a 2-dimensional code that includes embedded information;

Step 2, according to the version of the 2-dimensional code and the size of the 2-dimensional code module, scaling image (O) into square image (S);

Step 3, utilizing the image (S) to obtain a threshold mask (T);

Step 4, superimposing the image (S) and the 2-dimensional code, so as to find a corresponding area that the 2-dimensional code module corresponds to image (S).

Step 5, according to the color of the 2-dimensional code module, comparing the average luminance value L of a central block of the corresponding area with threshold T and a set robustness values, determining whether to modify the corresponding area.

Step 6, if there is no need to modify the corresponding area, the corresponding area does not be modified; if there is need to modify the corresponding area, then adjusting the luminance of the corresponding area by Gaussian modulating function, so that the corresponding area can match the color of the 2-dimensional code after a comparison between the average luminance value L and threshold T, the set robustness values.

Step 7, step 5-6 are repeated until all the corresponding area have been processed.

Step 8, blending image (S) and the corresponding areas for mark points of the 2-dimensional code to generates a 3-dimensional code.

In the step 2, the image (S) is a square with (17+4*V)*w pixels edges, where: w is the pixel of 2-dimensional code module, v is the version of the two-dimensional code.

The specific contents of step 3 as follows: converting the RGB color space of the image (S) to YUV color space of the image (S), processing the gray level image (G) of y-plane to generate the threshold mask (T), the threshold mask (T) as a threshold for adjusting the luminance of image (S).

The processing content is dividing the image that had converted to YUV color space into unduplicated blocks, let 5×5 blocks be a pane, defining the average luminance of all the unduplicated blocks in a pane whose centered a central block as the average luminance of the central block.

The specific contents of step 4 as follows: samples are taken around the central block of the corresponding area and being judged, if the central block is black, set the value of the corresponding area to be 1, if the central block is white, set the value of the corresponding area to be 0, and the average luminance of the corresponding area is replaced with the average luminance of the c×c pixel which corresponding to the central of 2-dimensional code module.

The specific contents of step 6 as follows: the change amount of luminance value as follows:

$$\Delta l_{m,n} = \begin{cases} 0 & \text{if } (l_{m,n} \leq t_{m,n} - randq_{m,n} = 0) \text{ or} \\ & (l_{m,n} \geq t_{m,n} randq_{m,n} = 1) \\ t_{m,n} - r - l_{m,n} & \text{if } l_{m,n} \geq t_{m,n} + randq_{m,n} = 1 \end{cases}$$

(m,n) is an index of 2-dimensional code module, $l_{m,n}$ represents the average luminance value of a coordinate (m,n) in the center block, $t_{m,n}$ represents threshold T of a coordinate (m,n) in the center block, $q_{m,n}$ represents the color of a coordinate (m,n) in the center block, if the central block is black, set $q_{m,n}$ to be 0, if the central block is white, set $q_{m,n}$ to be 1.

The step 8 further comprising the step 9: adding a white area around the 3-dimensional code The specific contents of step 9 as follows: the white area is 4*w pixels, wherein w is the length of 2-dimensional code module.

On the basis of the 2-dimensional code, a dimension of color and the luminance is added into the 2-dimensional code to generate the 3-dimensional code, it can represent the more data, with more information capacity. The present invention uses the color and the luminance to represent a third dimension, thus, achieving a three-dimensional code representation in the plane to. Since the acquisition of color and luminance in the reading device is determined by number bits converted by A/D, also the ability of printing equipment is need to be considered. Therefore, in the three-dimensional code production process, there is need to establish a suitable standard method to ensure its reading quality.

After adopting of the above technical scheme, utilizing the Gaussian function to generate a 3-dimensional code modify, that is modifying the luminance of the subject image pixels which corresponding to the 2-dimensional code module, so as to the change amount of the pixel color decreases smoothly from the center to the around. And it will be based on the smoothness of the block to determine the rate of decline, so that after adjusting the luminance the module block is more smooth, in line with the human visual system of color and luminance perception awareness, and it can achieve the goal of optimizing the visual.

Wherein, (a) is the original image, (b) is Visualead (14 refs), (c) is the paper (18 refs), (d) is the paper (19 refs), (e) is the method of the present invention.

DETAILED DESCRIPTION OF THE PREFERRED EMBODIMENTS

The invention utilizes the characteristic distribution of Gaussian modulating function to make 3-dimensional code.

The form of Gaussian modulating function (15 refs) as follows:

$$f(x) = \frac{1}{\sqrt{2\pi}\,\sigma} e^{-(x-\mu)^2/(2\sigma^2)} \qquad (1)$$

Application of the Gaussian function in image processing enable the color of image being smooth. The Gauss function contain two real parameters, that is, expected value μ and standard deviation σ, σ² is Variance. μ is Location Parameters of The Gauss function, Describes the location of central tendency of Gaussian function. The Gauss function is symmetric about μ, and the maximum of the distribution curve lies at μ, The function curve gradually decreases in the left and right direction of the μ. The function is equal to zero at infinity, σ is the separate degree of the Gaussian function value, the larger the σ, the more dispersed the data distribution, the more flattened the Gauss curve pattern; the smaller the σ, the more concentrated the data distribution, the more elongated the Gauss curve pattern. There is a inflection point in the μ±σ. The Gauss curve has an inflection point in μ±σ, showing a middle height and a low bell shape at both sides. The Gaussian curve has an inflection point at A, the pattern of the curve with the shape of a bell shape, and the middle high and both sides low.

Figure 1:
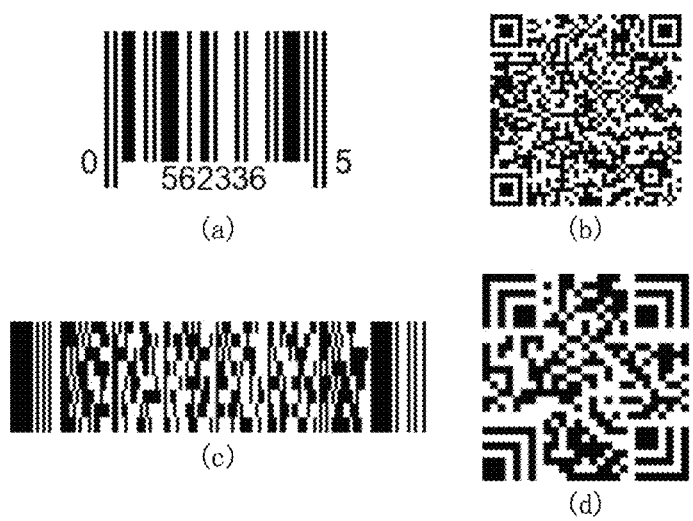
FIG. 1 provides illustration of various types of barcode;
Wherein, (a) is UPC, (b) is QR Code, (c) is PDF 417 code, (d) is Chinese-sensible Code.
Figure 2:
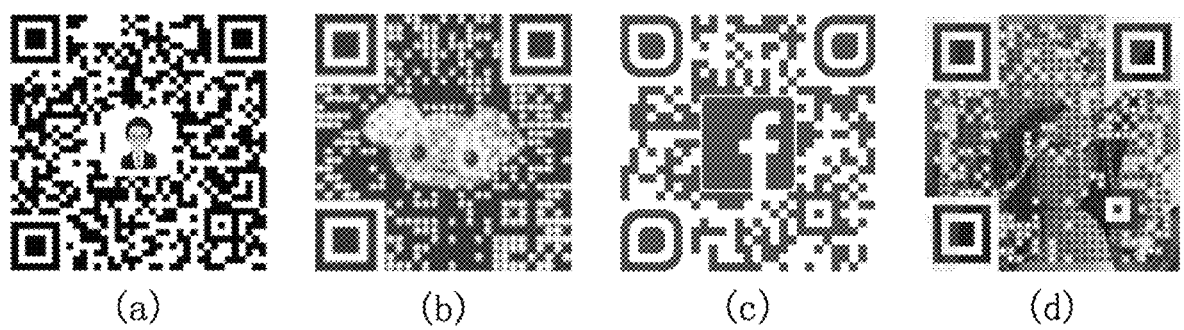
FIG. 2 provides illustration of the two-dimensional codes after beautified;
Wherein, (a) is Unitag, (b) is qr-code-generator, (c) is Vivalead, (d) is Visualead.
Figure 3:
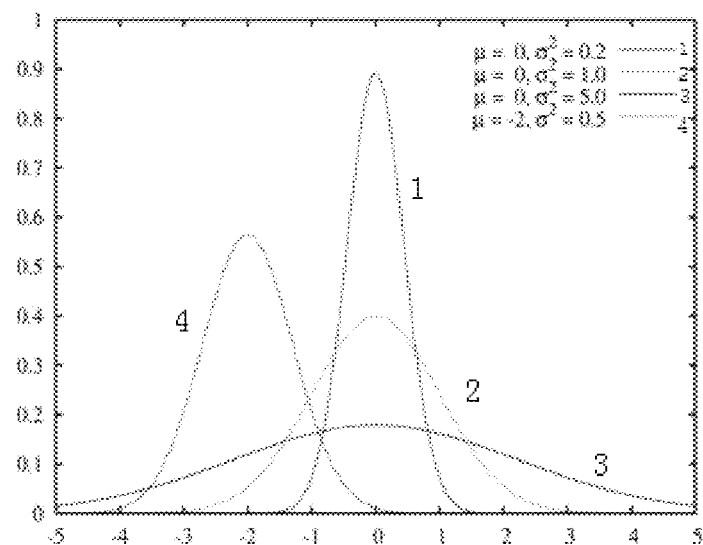
FIG. 3 provides illustration of Gaussian curve shape with different value of μ or σ.
Figure 4:
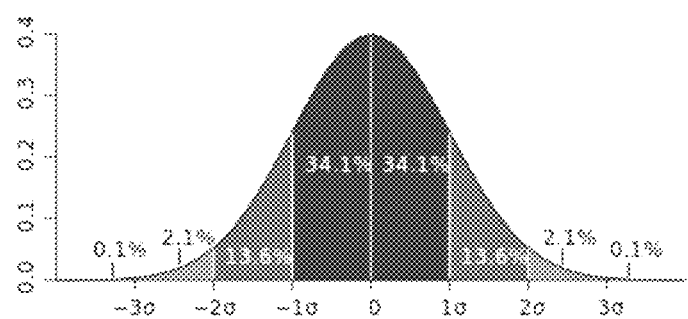
FIG. 4 provides illustration of Standard normal distribution of Gaussian function.

The Standard Normal Distribution of Gaussian function are widely used for various purposes, which means about 68.3% of Gaussian curve value is distributed within the distance from the average value, about 95.4% of Gaussian curve value is distributed within the distance from 2 standard deviation from the average value, and about 99.7% of Gaussian curve value is distributed within the distance from 3 standard deviation from the average value. As shown in FIG. 4, the dark blue area is a range which the values is less than 1 standard deviation from the average value, in normal distribution, in normal distribution, the ratio of the value in this range is 68% of all values; the ratio of the value within two standard deviations is 95% of all values; the ratio of the value within three standard deviations is 99% of all values.

In the present invention for producing a 3-dimensional code, according to the characteristic distribution of the Gaussian function, adjusting the luminance of the pixels of the corresponding area, so that the luminance of the central block is the brightest or darkest, the surrounding luminance gradually being dim or light, the color of the image is relatively smooth, and the 3-dimensional has a good visual effect.

Hereinafter, the present invention will be explained in more detail of technical scheme.

1.1 The Flow of Processes

Figure 5:
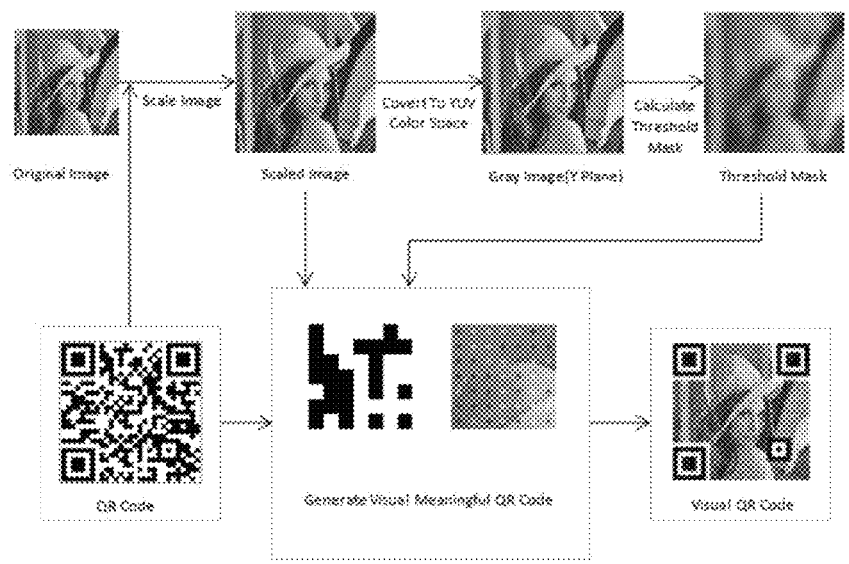
FIG. 5 provides illustration of a flowchart of the invention.

The method of generating 3-dimensional code provided by the invention mainly comprises four stages: generating a threshold mask and setting the luminance of the module block etc. FIG. 5 is a flow diagram of steps of the present invention, Table 1 is the detailed description of the invention notation used throughout.

TABLE 1 detailed description of the invention notation used throughout

| | |
|---|---|
| V | The version of the two-dimensional code |
| C | The level of Fault Tolerance |
| w | The pixels length of the module block of 2-dimensional code |
| O | The image in original subject |
| M | The module number of the 2-dimensional code length of a side, M = 17 + 4V |
| N | The module number of the 2-dimensional code length of a side, N = M × w |
| S | Scaled image |
| Q | The value of the module block of the 2-dimensional code |
| (m, n) | The index of the module block of the 2-dimensional code |
| Y | The luminance value of the image pixels in S |
| (i, j) | The index of the module block of the 3-dimensional code |
| L | The average luminance of the 2-dimensional code module corresponds to image(S) |
| B | The value of the module block of the 3-dimensional code |
| T | Threshold Mask |
| r | Robustness values of the 3-dimensional code |
| c | The pixel length of the central block in the 3-dimensional code |

The input information of the present invention: the version of the 2-dimensional code is V; the level of Fault Tolerance is C; the pixels in length of the module block of 2-dimensional code is w; the subject image is image (O). First, according to the version of the two-dimensional code V, by use of the equations (2) (3), the original image (O) is resized to pixels image (S), the size of the image (S) is N×N. This method uses an image scaling method that maintains aspect ratio, on the one hand to retain the overall image content information of the subject image, on the other hand that the main image objects can be presented in the original aspect ratio, get better visual effects.

$$M = 17 + 4V \qquad (2)$$

$$N = w \times M \qquad (3)$$

In the present invention, the module value of the 2-dimensional code is shown in Equation (4)

$$Q=\{q_{m,n}|q_{m,n}\in\{0,1\}\}, m=0,1,2,\ldots M-1, n=0,1,2,\ldots M-1. \quad (4)$$

The luminance of each pixel in the scaled image S is expressed is shown in Equation (5):

$$Y=\{y_{m+i,n+j}|y_{m+i,n+j}\in[0,1]\}, m,n=0,1,2,\ldots M-1, i, j=0,1,2,\ldots w-1. \quad (5)$$

The average luminance of the 2-dimensional code module corresponds to image (S) is shown in Equation (6):

$$L=\{l_{m,n}|l_{m,n}\in[0,1]\}, m=0,1,2,\ldots M-1, n=0,1,2,\ldots M-1. \quad (6)$$

The 3-dimensional code is also expressed as a module value, as shown in equation (7):

$$B=\{b_{m,n}|b_{m,n}\in\{0,1\}\}, m=0,1,2,\ldots M-1, n=0,1,2,\ldots M-1. \quad (7)$$

The invention adjusts the luminance Y of each pixel in the module block, so that the average luminance L of each pixel in the module central area is increased by ΔL, and ΔL reaches the requirement of the threshold of the corresponding position in the Threshold Mask (T). Y+ΔL ensures that the module values of 3-dimensional code and the original 2-dimensional code that at the same location can remain the same, that is, B=Q, means all the values at the same positions in B and Q are equality.

In conclusion, the mainly flow of processes of the invention as follows:

Input: a subject image (O) intends to be made to a 3-dimensional code, and the information to be embedded.

Output: a 3-dimensional code

Steps:

Step 1, generating a two-dimensional code that includes embedded information;

Step 2, according to the version of the two-dimensional code and the setting size of the 2-dimensional code module block (w), scaling O into a square image (S) has a length of (17+4*V)*w pixels;

Step 3, utilizing the image (S) to obtain a threshold mask.

Step 4, superimposing the image (S) and the 2-dimensional code, so as to find a corresponding area where the 2-dimensional code module corresponds to image (S).

Step 5, according to the color of the 2-dimensional code module, comparing the average luminance value L of a central block of the corresponding area with threshold T and a set robustness values, determining whether to modify the corresponding area.

Step 6, if there is no need to modify the corresponding area, the corresponding area does not be modified; if there is need to modify the corresponding area, then adjusting the luminance of the corresponding area by Gaussian modulating function, so that the corresponding area can match the color of the 2-dimensional code after a comparison between the average luminance value L and threshold T, the set robustness values.

Step 7, step 5-6 are repeated until all the corresponding area have been processed.

Step 8, blending image (S) and the corresponding areas for mark points to generates 3-dimensional code.

Step 9, adding a white area around the 3-dimensional code.

1.2 Generating the Threshold Mask

Figure 6:
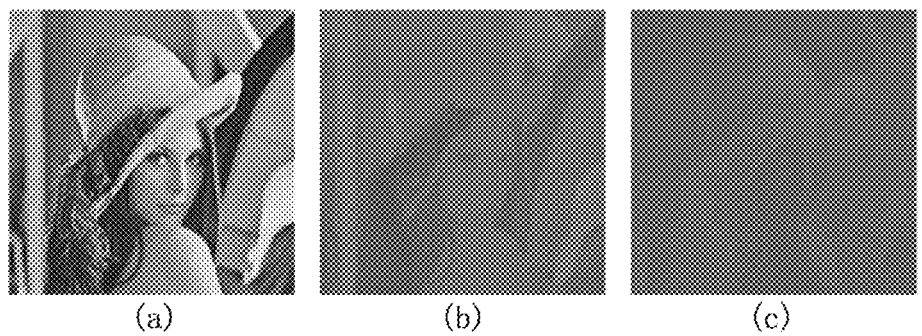
FIG. 6 provides illustration of YUV color space image component;
Wherein, (a) is Y plane, (b) is U plane, (c) is V plane.

In the invention, it is necessary to adjust the luminance of the image, so that the general RGB color space is converted into the YUV color space. In the YUV color space, Y represents the luminance, U and V represents Chrominance, as shown in FIG. 6. It is only necessary to adjusting the luminance of the image, thus, only extracting the Y-plane in YUV but the rest of the spaces are retained without any changes.

The present invention can generate a Threshold Mask of the scaled image (S) by the further processing of the gray level image (G) of the Y-plane, defining the black and white boundaries as a threshold for adjusting the luminance (S).

Figure 7:
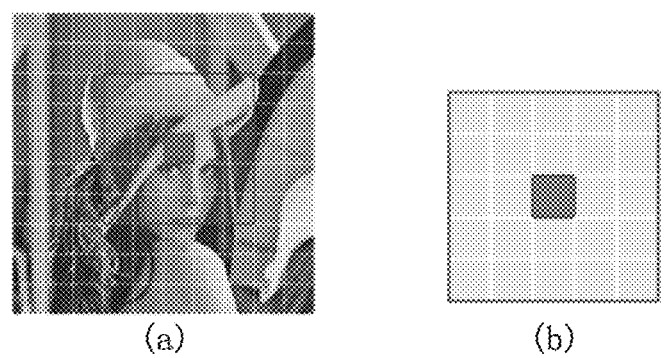
FIG. 7 provides illustration of the binarization methods of the invention;
Wherein, (a) is unduplicated blocks, (b) is a pane.

The invention refers to the program ZXing[16] and the binarization method mentioned in the paper[17], using a pane to calculate the average luminance of each block of the image, as shown in FIG. 7.

The image is divided into non-repetitive blocks, the size of the block changes with the size of the module block of 2-dimensional code, a pane size is set to 5×5 blocks, defining the average luminance of all the unduplicated blocks in a pane whose centered a central block as the average luminance of the central block, Equations (8) show the way of calculating.

$$t_{m,n} = \frac{1}{25 \cdot w^2} \sum_{p=m-2}^{p=m+2} \sum_{q=n-2}^{q=n+2} \sum_{(i,j)\in B_{p,q}} y_{i,j} \quad (8)$$

Figure 8:
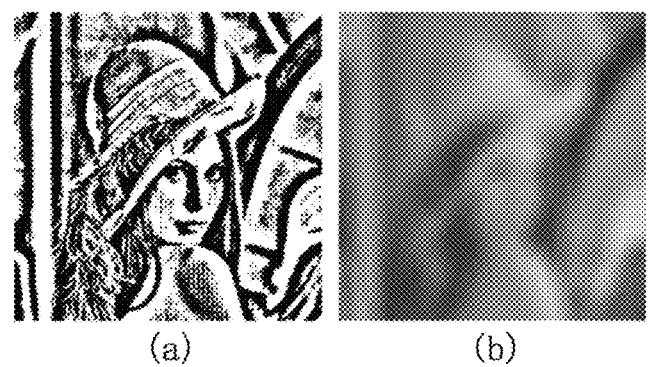
FIG. 8 is a view illustrating the results for the binarization;
Wherein, (a) is a image after the binarization, (b) is threshold mask (T)

For example, FIG. 8 shows the result of w=8, and the resulting threshold mask will be used later.

1.3 Set the Luminance of Module Block

For the 3-dimensional code making in the present invention, just superimposing the positioning mark of the image S corresponds to the area onto the correction mark area, according to the black and white color of the 2-dimensional code module to reduce or increase the corresponding blocks of the luminance, so as to modify the image and does not affect the positioning.

For coding the area corresponding to the 2-dimensional code, the following steps are used to adjust the luminance. Since the 2-dimensional image was binarized by the decoder, the module is detected. That is, samples are taken around the central block of the corresponding area and being judged, if the central block is black, set the value of the corresponding area to be 1, if the central block is white, set the value of the corresponding area to be 0. And, in order to correctly decode a 3×3 pixel module, there is need to ensure that the central block pixel contains the correct information. Therefore, when the method is processed for image (S), the average luminance of the corresponding area is replaced with the average luminance of the c×c pixel which corresponding to the central of 2-dimensional code module, calculation formulas as shown in Equation (9).

$$l_{m,n} = \frac{1}{c^2} \sum_{j=[(w-c)/2]+n}^{[(w+c)/2]+n} \sum_{i=[(w-c)/2]+m}^{[(w+c)/2]+m} y_{i,j} \quad (9)$$

Wherein, c should be at least ⅓ of the size of the module block (w). The larger the c, the better the robustness, but the worse the visual effect.

1.4 Determining the Attribute of the Module Block

The invention utilizes the threshold mask (T) which divides the black and white as the threshold of binarization to judge the attribute of module block of the scaled image (S), that is, determining whether the average luminance of the central area of the module need to be modify, and deriving the amount of adjustment. If the average luminance of the central area of the module satisfies the threshold value, then there is no need to modify the average luminance of the central area, as shown in Equation (10).

$$l_{m,n} = \begin{cases} l_{m,n}, & \text{if } (l_{m,n} \le t_{m,n} - r \text{ and } q_{m,n} = 0) \text{ or} \\ & (l_{m,n} \ge t_{m,n} + r \text{ and } q_{m,n} = 1), \\ t_{m,n} - r & \text{if } l_{m,n} > t_{m,n} - r \text{ and } q_{m,n} = 0, \\ t_{m,n} + r & \text{if } l_{m,n} < t_{m,n} + r \text{ and } q_{m,n} = 1. \end{cases} \quad (10)$$

Wherein, (m,n) is a index of 2-dimensional code module, $l_{m,n}$ represents the average luminance of a coordinate (m,n) of the center block, $t_{m,n}$ represents threshold T of a coordinate (m,n) of the center block, $q_{m,n}$ represents the color of a coordinate (m,n) of the center block, if the central block is black, set the value of the corresponding area to be 1.

In Equation (10), $l_{m,n}$ did not make any adjustments, because in the case of the average luminance value of the central area of the module has just met the conditions, the module block of the pixels are binarized, the detection module is just equal to the value of the two-dimensional code Color. In order to further adjust the $l_{m,n}$ which unsatisfied the threshold value, in Equation (10), adding or subtracting r (robustness values) from $t_{m,n}$ to achieve $l_{m,n}$ less than $t_{m,n}$ or greater than $t_{m,n}$. The larger r, the better the robustness of 3-dimensional code, but the worse the visual effect; the smaller r, the worse the robustness of 3-dimensional code, but the better the visual effect.

$$l_{m,n} = \begin{cases} l_{m,n} - r & \text{if } l_{m,n} > t_{m,n} \text{ and } q_{m,n} = 0, \\ l_{m,n} + r & \text{if } l_{m,n} < t_{m,n} \text{ and } q_{m,n} = 1. \end{cases} \quad (11)$$

If $l_{m,n}$ is equal to or near $t_{m,n}$, there is no modification of Equation (11). Thus, the Equation (11) is further modified to the Equation (12).

$$l_{m,n} = \begin{cases} t_{m,n} - r & \text{if } l_{m,n} > t_{m,n} - r \text{ and } q_{m,n} = 0, \\ t_{m,n} + r & \text{if } l_{m,n} < t_{m,n} + r \text{ and } q_{m,n} = 1. \end{cases} \quad (12)$$

In reality, when reading a scanning code, it will cause errors due to the difference of the display medium, the difference of the light source, and the difference of binarization algorithm of the decoder, thus, adding or subtracting r (robustness values) from $t_{m,n}$ to compromise these errors, so as to improve the probability of correct decoding.

In conclusion, the following Equation (13) is derived.

$$\Delta l_{m,n} = \begin{cases} 0 & \text{if } (l_{m,n} \le t_{m,n} - r \text{ and } q_{m,n} = 0) \text{ or} \\ & (l_{m,n} \ge t_{m,n} + r \text{ and } q_{m,n} = 1), \\ t_{m,n} - r - l_{m,n} & \text{if } l_{m,n} > t_{m,n} - r \text{ and } q_{m,n} = 0, \\ t_{m,n} + r - l_{m,n} & \text{if } l_{m,n} < t_{m,n} + r \text{ and } q_{m,n} = 1. \end{cases} \quad (13)$$

$\Delta l_{m,n}$ is the change amount of the $l_{m,n}$ required to ensure correct decoding, if $l_{m,n}$ has been satisfied with the binarization, the color of 2-dimensional code module is correct, and there is no need to modify the luminance; if not, then plus $\Delta l_{m,n}$ to the luminance. Wherein, if $\Delta l_{m,n}$ is positive that represents increasing luminance, if $\Delta l_{m,n}$ is negative that represents reducing luminance.

1.5 Adjust the Luminance of the Module Block

In the case of adjustment of module block luminance, in the present invention, $\Delta l_{m,n}$ is multiplied by a Gaussian coefficient to adjust the luminance value of the pixels in the module block, as shown in Equation (14).

$$g_{m+i,n+j} = \frac{1}{2\pi\sigma_{m,n}^2} e^{-\frac{(i-\frac{w}{2})^2 + (j-\frac{w}{2})^2}{2\sigma_{m,n}^2}}, \sum_{j=0}^{w}\sum_{i=0}^{w} g_{m+i,n+j} = 1. \quad (14)$$

So that the change amount of the luminance value of the pixel nearer to the center of the module is lager, but, the change amount of the average luminance of the central block, but, simultaneously, Equation (13) is also satisfied. As can be seen from Equation (14), the Gaussian coefficients of the modules are different, that depends on the Gaussian standard of the corresponding area deviation $\sigma_{m,n}$, and is $\sigma_{m,n}$ determined by the Dynamic of smooth degree $s_{m,n}$ of the same module block, as shown in Equations (15) and (16).

$$\sigma_{m,n} = b \cdot e^{-a \cdot s_{m,n}} \quad (15)$$

$$S_{m,n} = \frac{1}{w^2} \sum_{j=0}^{w}\sum_{i=0}^{w} (y_{m+i,n+j} - l_{m,n})^2. \quad (16)$$

$$y_{m+i,n+j} = y_{m+i,n+j} + \frac{c^2 \Delta l_{m,n}}{\sum_{f=[(w-c)/2]+m}^{[(w+c)/2]+n} \sum_{e=[(w-c)/2]+m}^{[(w+c)/2]+m} g_{e,f}} g_{m+i,n+j} \quad (17)$$

Equation (17) is a representation of the specific process described above. In the method of the invention, in the smooth module area, the standard deviation of the Gaussian can be larger, the change amount of the average luminance can be smaller; in the sharp module area, the standard deviation of the Gaussian can be smaller, the change amount of the average luminance can be larger, that conforms to the perception of color and luminance of the human visual system. Furthermore, the luminance of all module blocks are adjusted by using the Gaussian function to improve the recognition rates of the module central area to ensure correctly decoding, but also make the module block luminance changes more smoothly, and provides a better visual effect.

In Equations (15), the coefficient a and b are constants, the Gaussian function standard deviation of the corresponding area is determined by the smooth degree of the module block, but the coefficient a,b is related to the maximum value of the standard deviation of the set Gaussian function is related to the set maximum and minimum values of the standard deviation of the Gaussian function. This method dynamically adjusts the set standard deviation maximum $\sigma_{max}$ and the minimum $\sigma_{min}$ by parameters $\alpha$ and $\beta$, hereinafter Gaussian standard deviation coefficient for brevity, according to the standard normal distribution of the Gaussian function, more than 95% of the function values fall within the range where 2 standard deviations on both sides of the axis of symmetry, the formulas are designed as shown in equations (18) and (19).

$$\sigma_{max} = \frac{\alpha \cdot w}{4} \quad (18)$$

$$\sigma_{min} = \frac{\beta \cdot w}{4} \qquad (19)$$

Because of the c×c pixels area in the module (c should be at least ⅓ of the size of the module block) is an important area for module detection, Therefore, this method defaults to α=0.5, β=0.25. The larger the value of α and β, the larger the set maximum value and the minimum value of the standard deviation, the more the number of pixels changed by the center of the 3-dimensional code module, the smaller the change amount of pixels; the smaller the value of α and β, the smaller the set maximum value and the minimum value of the standard deviation, the less the number of pixels changed by the center of the 3-dimensional code module, the larger the change amount of pixels.

2. THE PARAMETERS OF STANDARD MANUFACTURING

2.1 Production Results

The equipment used in the invention is Intel® Core™ 17-4790 CPU 3.60 GHz, 4 GB RAM, using Java language to introduce ZXing library for three-dimensional code production, and providing user-defined parameters (such as the set up information to be embedded, the level of Fault Tolerance, the robustness values, the size of the module), the size of the central block and the Gaussian standard deviation coefficient α and β etc.

Figure 9:
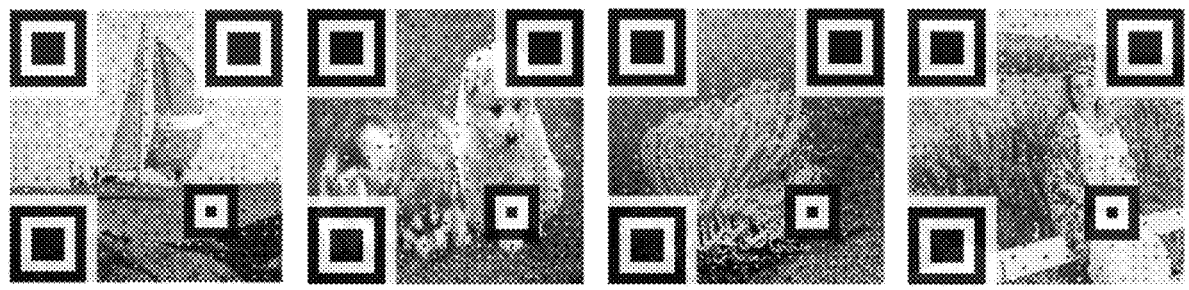
FIG. 9 is a schematic drawing illustrating processing results, wherein, c=11, r=32, α=0.5, β=0.25.

FIG. 9 illustrates the 3-dimensional codes of the present invention, and the version is 2, the level of Fault Tolerance is L, the size of the module is 25, the robustness values is 32, the size of the central block is 11, the Gaussian standard deviation coefficient α is 0.5, β is 0.25. The present invention considers the average luminance of the pixel block of the 2-dimensional code module corresponding to the theme image to satisfy the color of the original module without any modification so that the original image area can be maximized, otherwise, using Gaussian modulation function to adjust the brightness of the module block to smooth the luminance change, and improved visual effect.

2.2 Experiment

In order to carry out quality analysis of the results of this method, In the testing experimental stage, the correct decoding rate of the experimental results is tested by using different devices, different decoding applications and different parameters. 40 copies of the 3-dimensional code produced by this method were tested for obtaining the correct decoding rate of the test results, the size of the image is 25 pixels, In the case of version 2, Each picture has (25×25)×(25×25)=625×625 pixels, the image is displayed by DELL 2407WFP screen, and the camera lens is aimed at the 3-dimensional codes to test the experiment. The specific experimental test equipment and decoding applications are shown in Table 2.

TABLE 2

Description of Symbols used in the present invention

| number | mobile device | Code scanning program |
| --- | --- | --- |
| 1 | Samsung Galaxy S3 | NeoReader |
| 2 | Samsung Galaxy S3 | Barcode Scanner |
| 3 | HTC One(M7) | NeoReader |
| 4 | HTC One(M7) | Barcode Scanner |
| 5 | iPhone 5S | Scan QR Code in Wechat |
| 6 | iPad mini4 | Scan QR Code in Wechat |

2.3 The Quality of the 3-Dimensional Code

2.3.1 About Robustness Values

Figure 10:
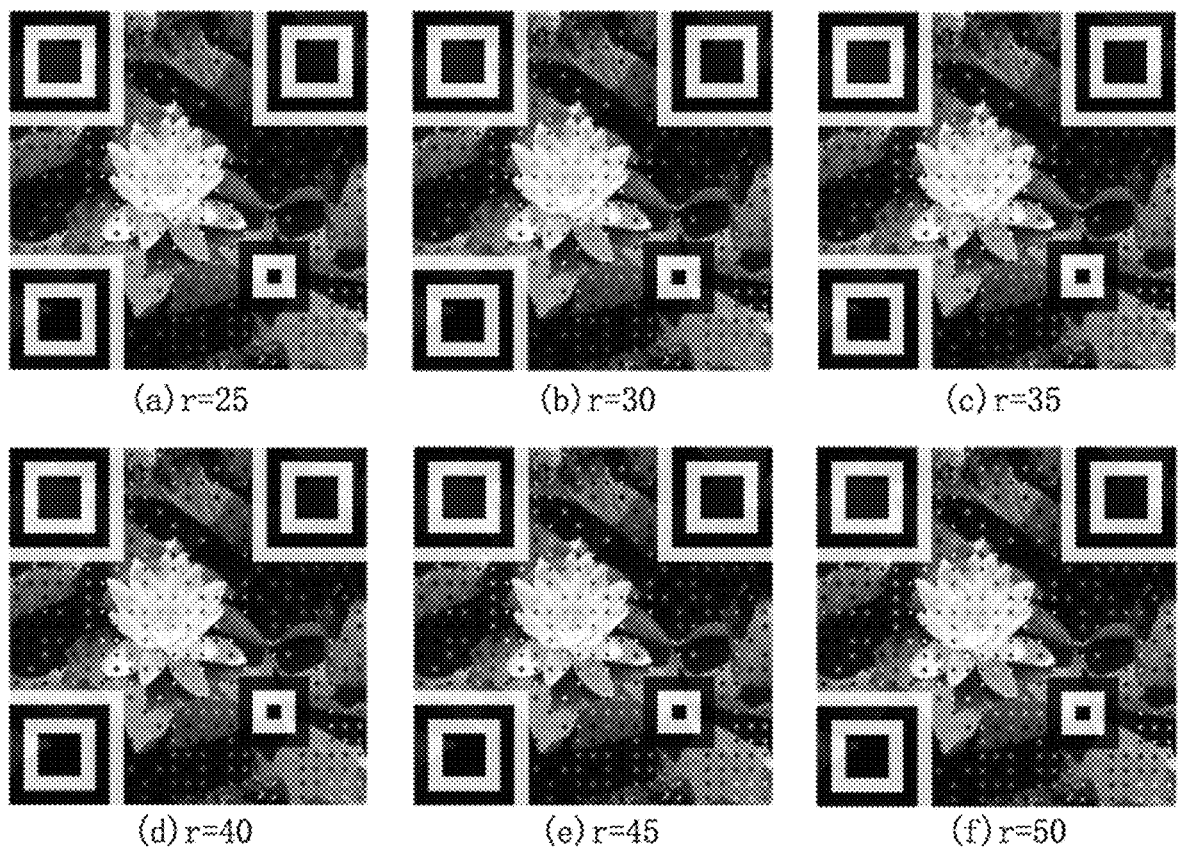
FIG. 10 is a diagram for comparison of processing results which made in different robustness values, wherein, c=9, α=0.5, β=0.25.
Figure 11:
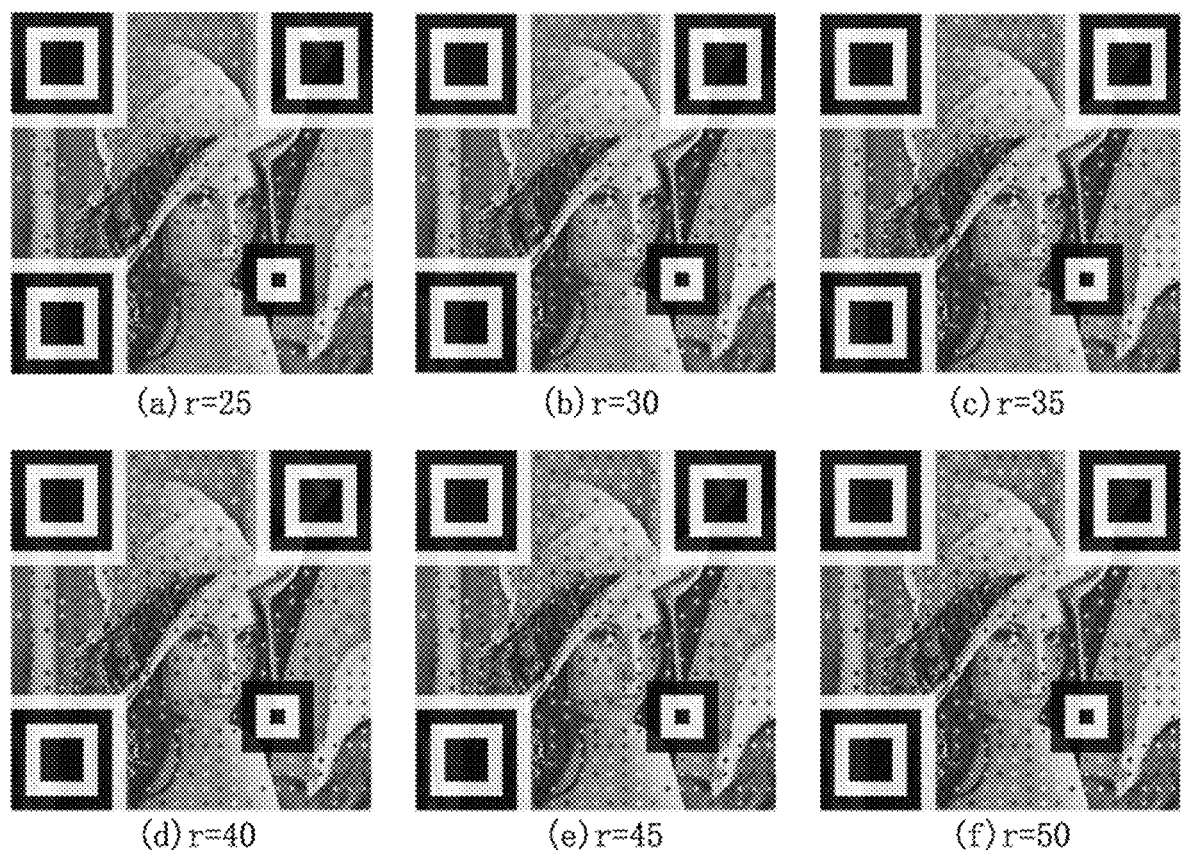
FIG. 11 is a diagram for comparison of processing results which made in different robustness values, wherein, c=9, α=0.5, β=0.2.

As the distribution of the luminance of each image is not the same, different performance feature of the scanning code devices and decoders, change of light source etc., Various factors influence the effect of decoding. In order to establish a standard robustness parameter, the size of central block is set to 9 (about ⅓ of the module size), the Gaussian standard deviation coefficient α is 0.5, β is 0.25, an then setting different robustness values to test the correct decoding rate of the experimental results. FIG. 10 and FIG. 11 shows the results of two images processed in different robustness values conditions, r is the robustness values, c is the size of the central block, α and β is the Gaussian standard deviation coefficients.

Figure 12:
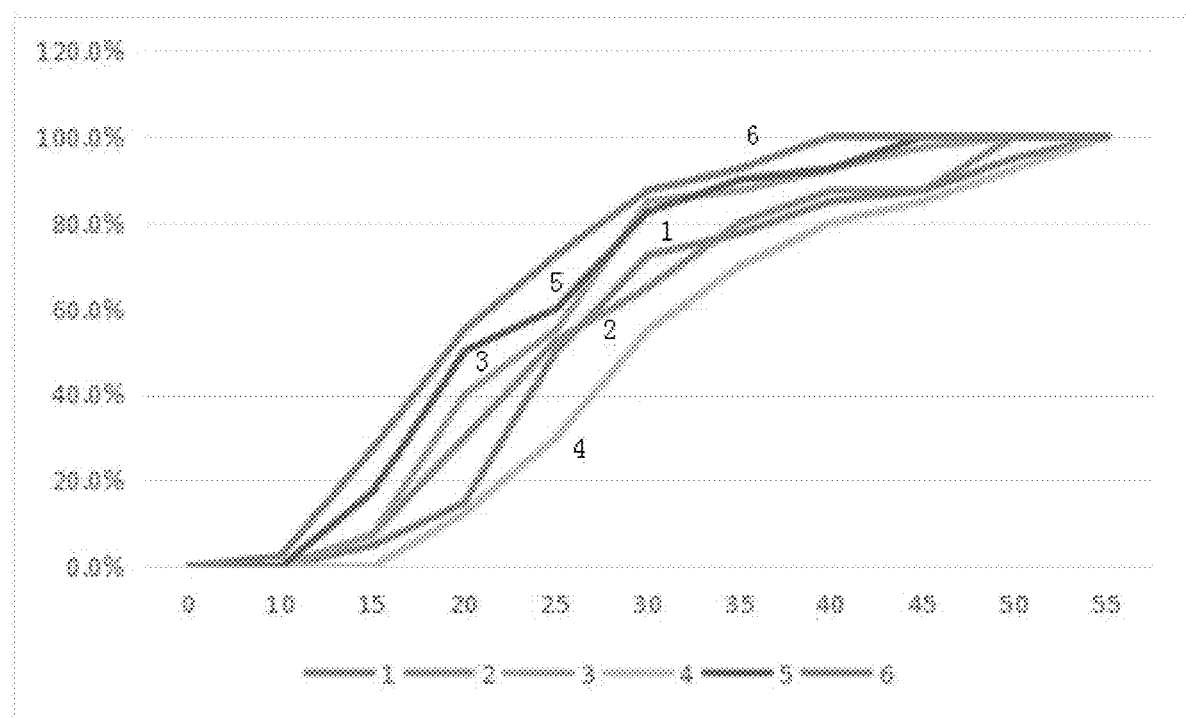
FIG. 12 is a schematic drawing illustrating the correct rate of decoding the 3-dimensional code which made in different robustness values, wherein, c=9, α=0.5, β=0.25.

As shown in FIG. 12, the abscissa indicates the value of the robustness, the ordinate indicates the correct rate of decoding, The serial number in the figure corresponds to the sequence number in Table 2, which represents the corresponding device and the decoding program. The serial number in the figure corresponds to the sequence number in Table 2, which represents the corresponding device and the decoding program. As can be seen from the result, at the robustness values is 40, the correct rate of 3-dimensional code decoding is higher than 80%, at the robustness values is 55, the correct rate of 3-dimensional code decoding is 100%. The larger the robustness values, The greater the robustness, the more stringent the standard of the determination of the modified image, the more areas of the original image being modified, the lower the image integrity, but the higher the decoding rate. According to the results of this experiment, the comprehensive visual quality, the standard will be robustness set to 45, so that the three-dimensional code produced with good decoding rate and close to the natural visual quality. According to the results of this experiment and the visual quality, the standard robustness values is set to 45, so that the 3-dimensional code with the high correct rate of decoding and close to the natural visual quality.

2.2.3 About the Central Block

Figure 13:
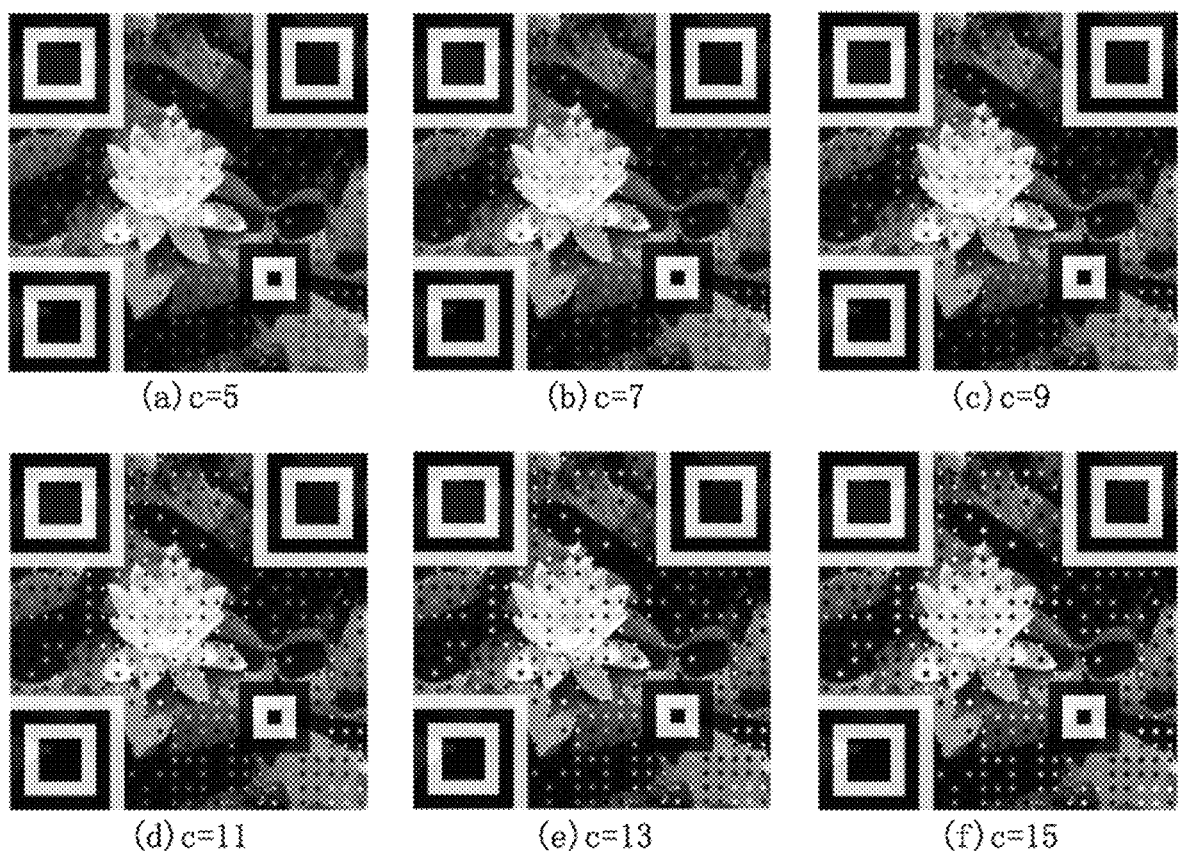
FIG. 13 is a diagram for comparison of processing results which made in different size of the module, wherein, r=45, α=0.5, β=0.25.
Figure 14:
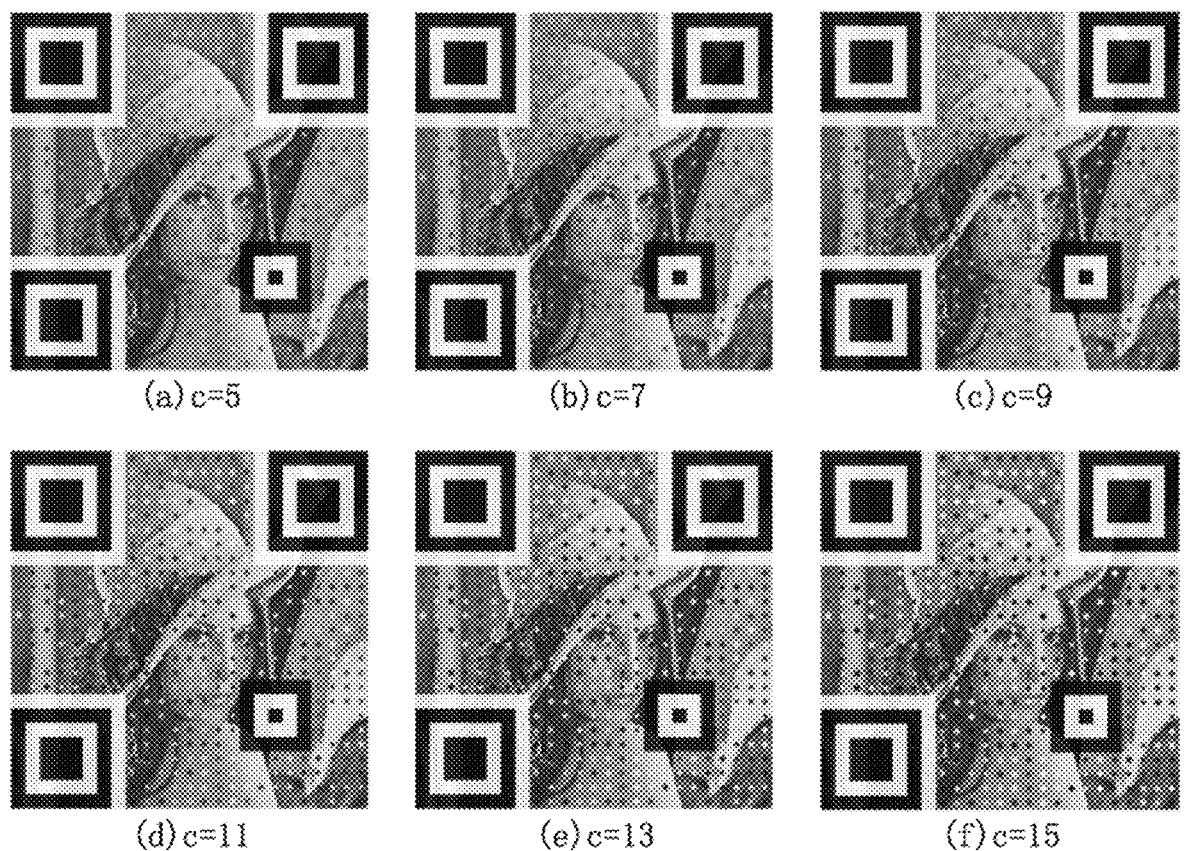
FIG. 14 is a diagram for comparison of processing results which made in different size of the module, wherein, r=45, α=0.5, β=0.25.
Figure 15:
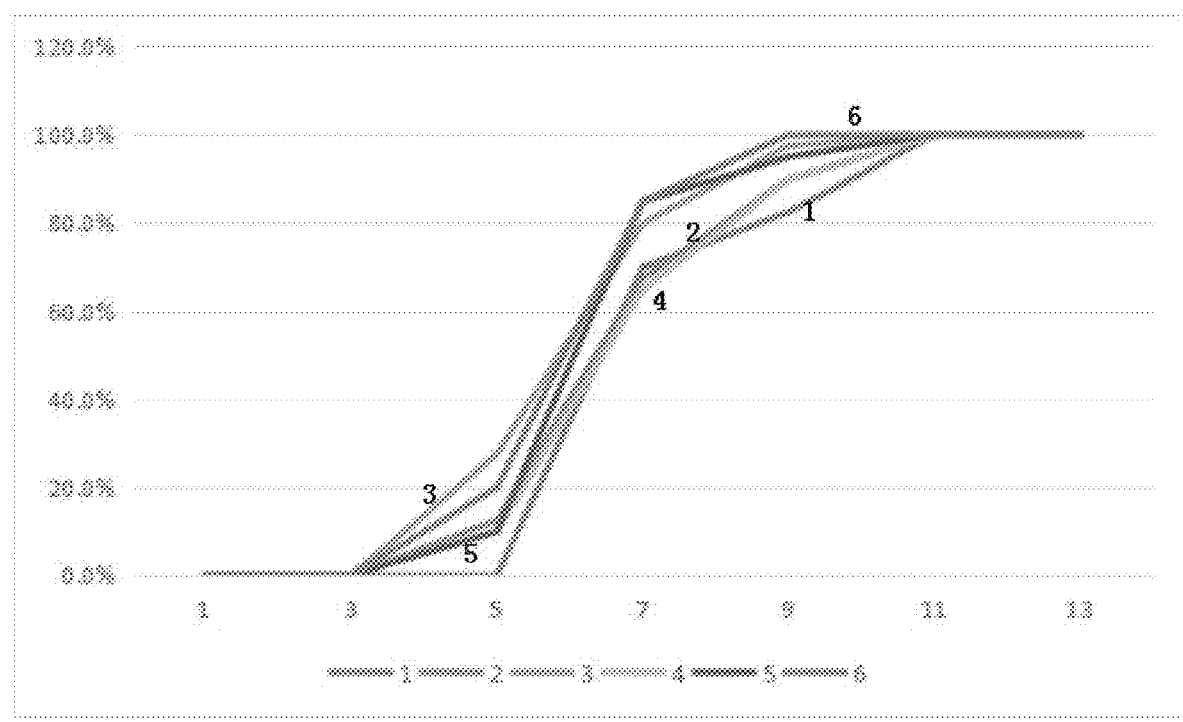
FIG. 15 is a schematic drawing illustrating the correct rate of decoding the 3-dimensional code which made in different size of the module, wherein, r=45, α=0.5, β=0.25.

On the basis of the parameters of the standard robustness values, in order to further establish the standard size of the central block, in this embodiment, the robustness values is set to 45, the Gaussian standard deviation coefficient α is 0.5, β is 0.25, the devices and decode programs in Table 2 be used as well to test the correct rate of different central block decoding. FIG. 13 and FIG. 14 illustrate the results of the two images made in different size of the central block, in this figure, r refers to the robustness values, c refers to the size of the central block, α and β is the Gaussian standard deviation coefficients.

As shown in FIG. 12, the abscissa indicates the size of the central block, the ordinate indicates the correct rate of decoding, As can be seen from the result, at the size of the central block is 11, the correct rate of 3-dimensional code decoding is higher than 100%, the larger the central block, the larger the change amount of the luminance, the higher the correct rate of decoding, but the lower the image integrity. According to the results of this experiment the standard size of the central block is set to 11, both to ensure that the success of decoding, but also get a good visual quality.

2.3.3 About the Gaussian Standard Deviation

Figure 16:
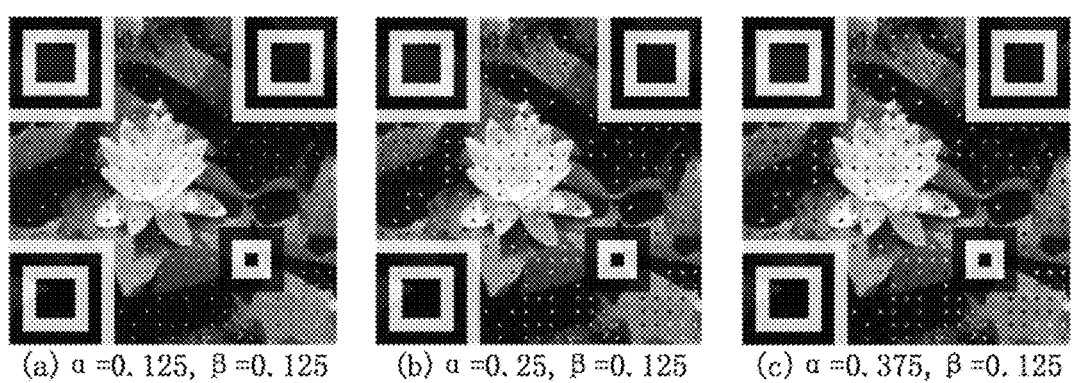
FIG. 16 is a diagram for comparison of processing results which made in different Gaussian standard deviation coefficients, wherein, r=45, c=11.
Figure 16:
Figure 17:
FIG. 17 is a diagram for comparison of processing results which made in different Gaussian standard deviation coefficients, wherein, r=45, c=11.
Figure 17:
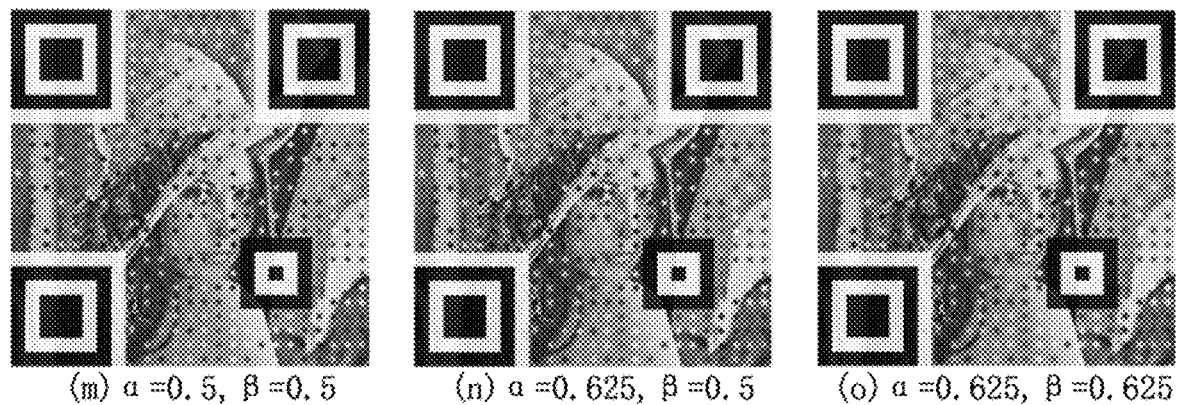

In this embodiment, the robustness values is set to 45, the size of the central block is set to 11, In the case of the different Gaussian standard deviation coefficients were set to the values shown in FIG. 16 and FIG. 17, the 3-dimensional code with good visual quality and the high correct rate of decoding. As can be seen from the figures, the larger the Gaussian standard deviation coefficients, the maximum value and the set minimal value are set to be a larger value, the larger the change pixels amount of the central blocks, the smaller the change amount of the luminance, that conforms to the human visual system.

3. CONCLUSION 2-dimensional code is now widely used in most mobile devices, allowing users to quickly and accurately access the relevant information. But the chaotic appearance of the traditional 2-dimensional code can not make people intuitive understanding of its content of the association in vision, but the traditional 2-dimensional code appearance are chaotic so that it can not make people intuitively understand its content of the association in vision, and can not achieve the desired result. In addition, the ugly appearance affects the beauty of its media, so the three-dimensional code is bound to become a new trend. In addition, the unsightly appearance affects the beauty of its media, so the 3-dimensional code is bound to become a new trend.

Modifying the module coding is one of the methods to beauty the 2-dimensional code, which mainly utilizes the fault-tolerant capability of the 2-dimensional code and embedding the image the stuffing bits of the coding area to embed the image, but the area of the embedded image is limited by fault-tolerant level, version size, embedded information length and many other factors. Therefore, embedding the image directly to the module structure affects the decoding, and utilizing the stuffing bits to manipulate encoding takes a long time, the effect of beautification is not satisfactory.

The invention adopts the method of not modifying the module coding, but changes the luminance or color of the module. The same method as shown in Table 3, the process of the paper (literature 14,18,19) modify each central block to ensure an accurate identification of the 3-dimensional code, and the use of other areas to make the representation of image be more perfect.

TABLE 3 characteristic comparison of between the present invention and other related method

| | Color image | Modify the central block | The image covers the entire area | Quick generation speed | Large data density | Good visual quality |
|---|---|---|---|---|---|---|
| Visualead[14] | ○ | ○ | ○ | ○ | ○ | |
| paper[18] | | ○ | ○ | | | |
| paper[19] | ○ | ○ | ○ | | ○ | |
| Standard Method of the present invention | ○ | ○ | ○ | ○ | ○ | ○ |

Figure 18:
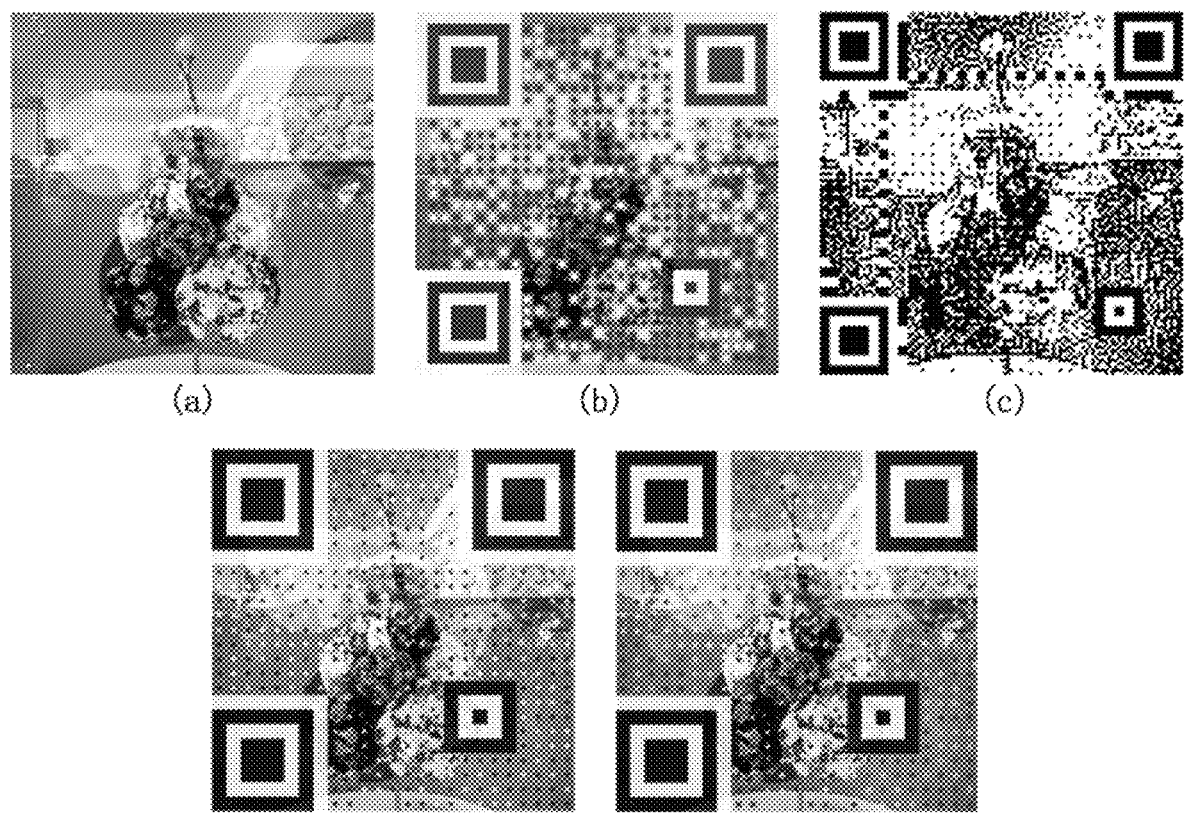
FIG. 18 is a diagram for comparison of the processing results of the invention with the processing results of similar method.

FIG. 18 shows the results of the present invention in comparison with the results of the above method. Visualead (14 refs) is a online code program, in order to express the color of each module and modify the entire module, resulting in the image looks obtrusive and uneven, the representation of the original image is not perfect. In the paper (18 refs), it is proposed that cutting the module into 3×3 sub-module and utilizing Halftoning Techniques to represent the image more perfectly, it is found that the central block of the 2-dimensional code module is the key area to determine the color of the module for decoding, but this method requires a lot of calculations to allocate each module by the most appropriate pattern, the image synthesis efficiency is low and the visual effect is limited. In the method of the paper (19 refs), the recognition capability of the square of the center of the module is enhanced to make the module center being black or white, although this method ensure the correct rate of decoding, the obtrusive black and white grid makes the visual effect is still not good enough.

The invention utilizes the Gaussian modulation function to adjust the luminance of the module block so that the luminance of the pixel changes smoothly, and the luminance of the central region of the changed module is changed by circular diffusion, that more conforms to the human visual system, and the process of other similar methods are mostly adjust the luminance by a square central block of the module, the visual effect is not good.

In conclusion, the method and the related parameter proposed by the invention can make the 3-dimensional code easier to be recognized by the human eye while ensuring that the average luminance value of the pixel in the central region of the module satisfies the threshold value of the binarization requirement, and can effectively guarantee the robustness of decoding.

In summary, on the basis of the 2-dimensional code, a dimension of color and the luminance is added into the 2-dimensional code to generate the 3-dimensional code, In the production process, the amount of the damaged modules should be minimize in the production process, and using the largest available area, maintaining the visual fidelity of the original image. Thus, first, according to the size of the module, the central area is divided into different layers, each layer is a rectangular or circular, the luminance of the outermost layer just meeting the threshold which required for binarization, the closer to the module center the layer, the luminance of the layer closer to the luminance of 2-dimensional code, that ensure the two-dimensional code can be correctly decoded. Secondly, in the present method, utilizing the Gaussian function to modify the luminance of the center module area, so as to the change amount of the pixel color decreases smoothly from the center to the around, And it will be based on the smoothness of the block to determine the rate of decline, so that after adjusting the luminance the module block is more smooth, in line with the human visual system of color and luminance perception awareness, and it can achieve the goal of optimizing the visual.

The embodiments disclosed in the present invention are intended to illustrate the scope of the technical idea of the present invention, and the scope of the present invention is not limited by the embodiment. All the simple modification, changes and embellishment of the above embodiments according to the material contents of the invention shall be within the protection scope of the invention.

What is claimed is:

1. A method of generating 3-dimensional code based on Gaussian modulating function, characterized in that it comprises the steps of:

Step 1, generating a 2-dimensional code that includes embedded information;

Step 2, according to a version of the 2-dimensional code and a size of the 2-dimensional code module, scaling image (O) into square image (S);

Step 3, utilizing the square image (S) to obtain a threshold mask (T);

Step 4, superimposing the square image (S) and the 2-dimensional code, so as to find a corresponding area that the 2-dimensional code module corresponds to the square image (S);

Step 5, according to the color of the 2-dimensional code module, comparing an average luminance value L of a central block of the corresponding area with said threshold mask T and a set robustness values, determining whether to modify the corresponding area;

Step 6, if there is no need to modify the corresponding area, the corresponding area does not be modified; if there is need to modify the corresponding area, then adjusting the luminance of the corresponding area by Gaussian modulating function, so that the corresponding area can match the color of the 2-dimensional code after a comparison between the average luminance value L and said threshold mask T, the set robustness values;

Step 7, step 5-6 are repeated until all the corresponding area have been processed; and Step 8, blending said square image (S) and the corresponding areas for mark points of the 2-dimensional code to generate a 3-dimensional code.

2. The method of generating 3-dimensional code based on Gaussian modulating function of claim 1, wherein the step 2 specifically includes: the square image (S) is a square with $(17+4*V)*w$ pixels edges, where: w is the pixel of 2-dimensional code module, v is the version of the two-dimensional code.

3. The method of generating 3-dimensional code based on Gaussian modulating function of claim 1, wherein the step 3 specifically includes: converting a RGB color space of the square image (S) to VUV color space of the square image (S), processing a gray level image (G) of y-plane to generate the threshold mask (T), the threshold mask (T) as a threshold for adjusting the luminance of the square image (S).

4. The method of generating 3-dimensional code based on Gaussian modulating function of claim 3, wherein it specifically includes: dividing the square image (S) that was converted to VUV color space into unduplicated blocks, let 5×5 blocks be a pane, defining the average luminance of all the unduplicated blocks in a pane whose centered a central block as the average luminance of the central block.

5. The method of generating 3-dimensional code based on Gaussian modulating function of claim 1, wherein the step 4 specifically includes: samples are taken around the central block of the corresponding area and being judged, if the central block is black, set the value of the corresponding area to be 1, if a central block is white, set the value of the corresponding area to be 0, and the average luminance L of the corresponding area is replaced with the average luminance L of the c×c pixel which corresponding to the central of 2-dimensional code module.

6. The method of generating 3-dimensional code based on Gaussian modulating function of claim 1, wherein the step 6 specifically includes: a change amount of luminance value as follows:

$$\Delta l_{m,n} = \begin{cases} 0 & \text{if } (l_{m,n} \leq t_{m,n} - randq_{m,n} = 0) \text{ or} \\ & (l_{m,n} \geq t_{m,n} randq_{m,n} = 1) \\ t_{m,n} - r - l_{m,n} & \text{if } l_{m,n} \geq t_{m,n} + randq_{m,n} = 1 \end{cases}$$

Wherein, (m,n) is an index of 2-dimensional code module, $l_{m,n}$ represents the average luminance L value of a coordinate (m,n) in the center block, $t_{m,n}$ represents the threshold mask T of a coordinate (m,n) in the center block, $q_{m,n}$ represents the color of a coordinate (m,n) in the center block, if the central block is black, set $q_{m,n}$ to be 0, if the central block is white, set $q_{m,n}$ to be 1.

7. The method of generating 3-dimensional code based on Gaussian modulating function of claim 1, wherein the step 8 further comprising the step 9: adding a white area around the 3-dimensional code.

8. The method of generating 3-dimensional code based on Gaussian modulating function of claim 7, wherein the step 9 specifically includes: the white area is 4*w pixels wide, wherein w is the length of 2-dimensional code module.

* * * * *